United States Patent
McCormick et al.

(10) Patent No.: US 9,719,533 B1
(45) Date of Patent: Aug. 1, 2017

(54) VEHICLE HOOD LIFTER WITH DETACHABLE PISTON ROD

(71) Applicant: TK Holdings Inc., Armada, MI (US)

(72) Inventors: David M. McCormick, Grosse Point Farms, MI (US); Jeremy M. Henck, White Lake, MI (US)

(73) Assignee: TK Holdings Inc., Auburn Hills, MI (US)

( * ) Notice: Subject to any disclaimer, the term of this patent is extended or adjusted under 35 U.S.C. 154(b) by 579 days.

(21) Appl. No.: 14/101,222

(22) Filed: Dec. 9, 2013

Related U.S. Application Data

(60) Provisional application No. 61/734,959, filed on Dec. 7, 2012.

(51) Int. Cl.
*F15B 15/19* (2006.01)
*F15B 15/02* (2006.01)

(52) U.S. Cl.
CPC .................. *F15B 15/02* (2013.01)

(58) Field of Classification Search
CPC ...... F15B 15/02; F15B 15/19; F15B 15/1447; F15B 2211/853; B60R 21/38; B60R 21/264; B60R 22/1955; B60R 2022/327; F16J 1/10; F16J 1/20; F16J 1/12; F16J 1/06; F16J 1/09; F16J 9/08
USPC ..... 92/172, 179, 181 R, 129, 128, 255, 182, 92/174, 185; 89/1.14; 91/401, 5; 60/632, 633, 634, 635, 638, 512
See application file for complete search history.

(56) References Cited

U.S. PATENT DOCUMENTS

| 30,351 | A | * | 10/1860 | Robinson | F16J 9/08 92/183 |
|---|---|---|---|---|---|
| 841,527 | A | * | 1/1907 | Imler | F01B 17/04 91/245 |
| 2,392,182 | A | * | 1/1946 | Payne | F16J 15/48 277/436 |
| 2,414,013 | A | * | 1/1947 | Bowers | F16J 9/08 277/451 |
| 3,720,188 | A | * | 3/1973 | Mead | F22B 27/165 122/41 |
| 4,073,217 | A | * | 2/1978 | Colin | F15B 15/262 188/300 |
| 4,105,008 | A | * | 8/1978 | Resler, Jr. | F02B 21/00 123/193.6 |
| 5,079,997 | A | * | 1/1992 | Hong | B23Q 1/262 188/67 |
| 7,857,087 | B2 | * | 12/2010 | Matsuura | B60R 21/02 180/274 |
| 7,946,376 | B2 | | 5/2011 | Hayashi et al. | |
| 8,141,671 | B2 | | 3/2012 | Aoki et al. | |
| 8,549,975 | B2 | | 10/2013 | Schafer et al. | |

(Continued)

FOREIGN PATENT DOCUMENTS

WO    WO 2013043089    3/2013

*Primary Examiner* — Michael Leslie
*Assistant Examiner* — Dustin T Nguyen
(74) *Attorney, Agent, or Firm* — Meunier Carlin & Curfman LLC

(57) ABSTRACT

A gas-powered actuator is provided. The actuator includes a housing and a piston movably positioned within the housing. A cavity is formed in the piston. The housing includes an opening formed therein. The opening is structured to permit insertion of a piston rod into the opening, then into the piston cavity.

16 Claims, 6 Drawing Sheets

(56) References Cited

U.S. PATENT DOCUMENTS

2004/0128998 A1* 7/2004 Daunas ................ F15B 15/261
60/635
2007/0251750 A1* 11/2007 Takakura ................ B60R 21/38
180/274
2008/0083392 A1* 4/2008 Kurihara .................. F01M 1/04
123/196 CP

* cited by examiner

A →

VEHICLE HOOD LIFTER WITH DETACHABLE PISTON ROD

CROSS-REFERENCE TO RELATED APPLICATIONS

This application claims the benefit of U.S. Provisional Application Ser. No. 61/734,959, filed on Dec. 7, 2012, the disclosure of which is incorporated herein by reference in its entirety.

BACKGROUND OF THE INVENTION

The present invention relates to actuators powered by ignition and/or combustion products and designed to elevate a vehicle surface such as a hood, in the event of collision or impact with a pedestrian. Exemplary linear actuators typically employ pyrotechnic means to activate a piston within an actuator. U.S. Pat. No. 6,568,184 exemplifies known pyrotechnic actuators and is herein incorporated by reference in its entirety. The pyrotechnic means typically include an initiator or igniter, and may include a gas generating composition ignitable by the igniter once the actuator is activated.

A continuing need is to reduce and/or minimize the size and cost of actuators operable by pressurized gases.

SUMMARY OF THE INVENTION

In one aspect of the embodiments described herein, a gas-powered actuator is provided. The actuator includes a housing and a piston movably positioned within the housing. A cavity is formed in the piston. The housing includes an opening formed therein. The opening is structured to permit insertion of a piston rod into the opening, then into the piston cavity.

In another aspect of the embodiments of the described herein, a piston for a gas-powered actuator is provided. The piston includes a body portion defining a first interior cavity, and a first flange extending from the body portion. A groove is structured for receiving a sealing means therein. At least one opening is provided enabling fluid communication between the first cavity and the groove. The groove is positioned between the first flange and the at least one opening.

DETAILED DESCRIPTION

Figure 1:
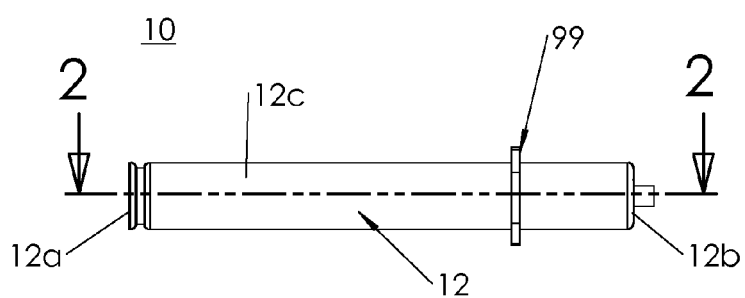
FIG. 1 is a side view of an actuator in accordance with one embodiment of the present invention.

In the descriptions set forth herein, like reference numerals refer to like elements of embodiments of the present invention.

FIGS. 1-9 show embodiments of an actuator in which a piston and an attached piston rod is driven or moved along the interior of a housing by ignition and/or combustion products acting on the piston. Such an actuator is usable to, for example, elevate a vehicle surface such as the vehicle hood in the event of collision or impact with a pedestrian. However, an actuator in accordance with one of the embodiments described herein may be used in any of a variety of other suitable applications.

Figure 2:
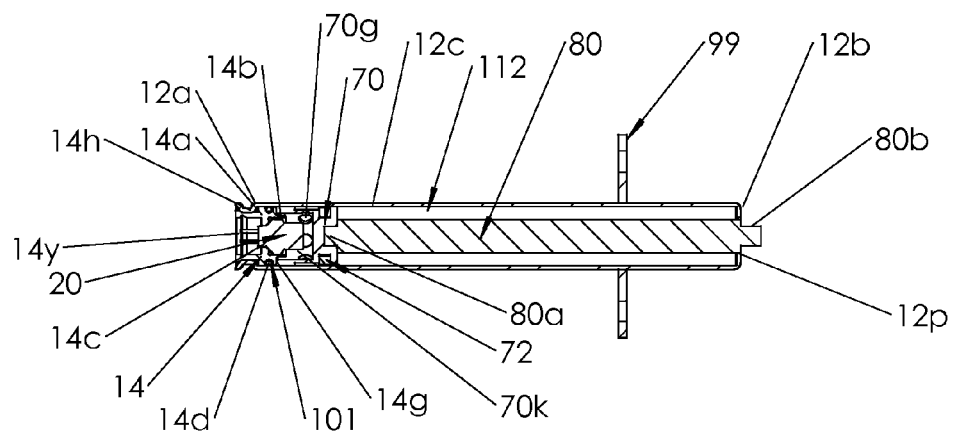
FIG. 2 is a cross-sectional side view of the embodiment shown in FIG. 1.
Figure 3:
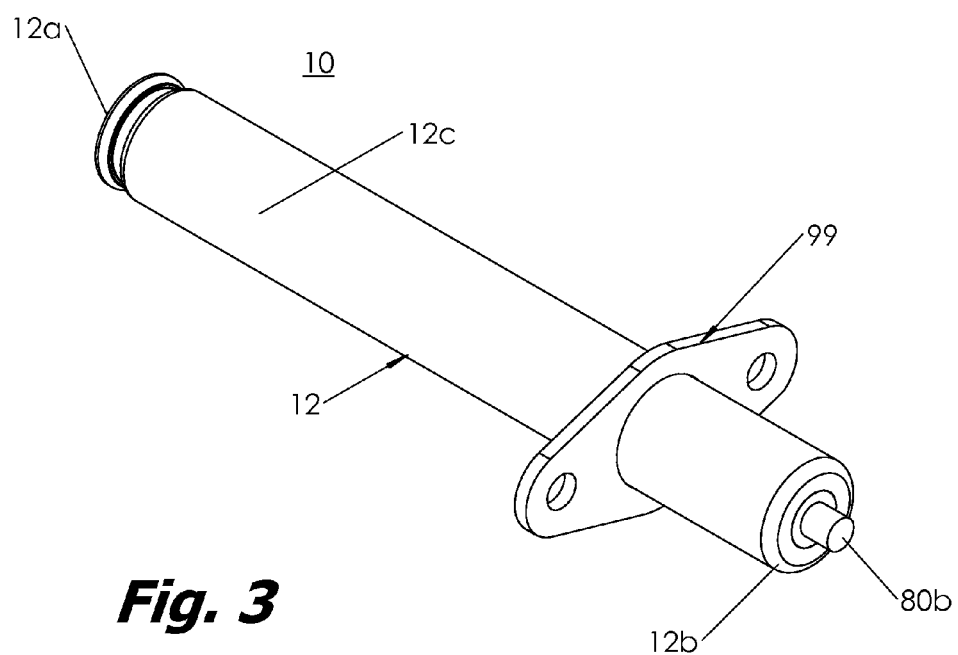
FIG. 3 is a perspective view of the embodiment shown in FIG. 1.

Referring to FIGS. 1 and 2, one embodiment 10 of an actuator includes a substantially cylindrical housing 12 having a first end 12a, a second end 12b opposite the first end, and a wall 12c extending between the ends to define a housing interior cavity 112. In the embodiment shown in FIGS. 1 and 2, housing second end 12b is crimped or otherwise formed so as to provide an opening 12p dimensioned to permit insertion of a piston rod 80 (described below) therethrough, while preventing passage of a piston 70 (also described below) through the opening 12p and out of the housing after activation of the actuator. Housing 12 is made from a metal or metal alloy and may be a cast, stamped, deep-drawn, extruded, or otherwise metal-formed. A mounting flange 99 may be welded or otherwise secured to an exterior of housing 12 to facilitate attachment of the housing to a portion of the vehicle, using fasteners, welding, or any other suitable means.

Housing first end 12a is configured for receiving a portion of a suitable initiator 20 (described below) therein, and is also configured to aid in retaining the initiator in place within the housing 12 once the initiator has been positioned. Housing end 12a may be structured so as to support and maintain initiator 20 in position during operation of the actuator. In the embodiment shown in FIGS. 1-4, a portion of housing end 12a is crimped over (or otherwise configured to engage) a first end closure 14 (described below) in which the initiator is secured.

Referring to FIGS. 1 and 2, first end closure 14 includes a base portion 14a and a wall 14b extending from the base portion to form a cavity 14c configured for receiving initiator 20 therein. A groove 14d is formed along an exterior surface of the end closure for mounting of a compressive seal 101 (for example, an O-ring, gasket, or other suitable seal) therein. Seal 100 forms a substantially gas-tight seal between the end closure and the housing 12.

End closure 14 may also include a first shoulder 14g projecting outwardly from wall 14b to provide a bearing surface for engaging a piston 70 (described below). First end closure 14 may also include a recess 14h configured to receive therein a portion of housing 12 which is crimped or otherwise formed engage the end closure to help retain the end closure within (or attached to) the housing. An end portion 14y of the first end closure 14 may be configured to provide an interface mateable with a complementary connector of a wiring harness or other suitable initiator activation signal transmission medium. End closure 14 may be formed by stamping, casting, molding or any other suitable method and may be made from carbon steel, stainless steel, or any other suitable material.

Referring again to FIGS. 1 and 2, an initiator 20 is positioned and secured in end closure 14 so as to provide fluid communication between the initiator and piston 70. Initiator 20 may be fabricated as known in the art, and initiators suitable for the applications described herein are commercially available from any of a variety of vendors. One exemplary initiator construction suitable for the applications described herein is disclosed in U.S. Pat. No. 6,009,809, herein incorporated by reference. Alternatively, initiator 20 may be in the form of a known micro-gas generator.

In accordance with one embodiment, no gas generant material is used in conjunction with the initiator and its associated ignition products to further increase the pressure in chamber 70k after activation of the actuator. In this embodiment, the pressurized gases are generated only by combustion of the ignitable compound incorporated into or integral with the initiator itself. In another embodiment, a quantity of gas generant material separate from any ignition compound may be included in cavity 70f or otherwise positioned exterior of the initiator. Combustion of the initiator compound then produces combustion of the gas generant (either directly or acting through a suitable booster material positioned in cavity 70f or otherwise exterior of the initiator), thereby increasing the amount and pressure of the generated gases and the associated pressure acting on piston 70.

Referring to FIGS. 2 and 4-9, a piston 70 is positioned within housing cavity 112 opposite initiator 20. Piston 70 has body portion 70c, a first exterior flange 70a extending from the body portion, and a second exterior flange 70b extending from the body portion at a location spaced apart from first flange 70a. In the embodiment shown, the first flange 70a is positioned at a first end of the piston and the second flange 70b is positioned at a second end of the piston opposite the first end. However, either of the flanges may be positioned at any desired location along the piston exterior, according to the requirements of a particular application. Flanges 70a and 70b are dimensioned to provide close sliding fits with interior surfaces of housing wall 12c during operation of the actuator, to support the ends of the piston within the housing 12. The sliding fit between the flanges 70a and 70b and the housing wall is structured to minimize the flow of pressurized gases between the flanges 70a and 70b and the housing wall 15 during operation of the actuator. Body portion 70c includes a base portion 70d and a wall 70e extending from the base portion to define an interior cavity 70f. In the embodiment shown in FIGS. 2 and 4-9, second exterior flange 70b is formed along an exterior surface of wall 70e. At least one opening 70g is formed in wall 70e to enable fluid communication between cavity 70f and a groove 70h (described below) along the exterior of the piston. In the embodiment shown in FIGS. 2, 4 and 5, a plurality of openings 70g is formed in wall 70e to enable fluid communication between cavity 70f and the groove along the exterior of the piston. The end of wall 70e along which second exterior flange 70b is formed abuts end closure 14 along shoulder 14g prior to activation of the actuator. Thus, as seen in FIG. 2, piston 70, end closure 14, and initiator 20 combine to define a chamber 70k for receiving an initial flow of pressurized ignition products resulting from activation of initiator 20. A groove 70h is formed between first outer flange 70a and cavity 70f. Groove 70h is structured for receiving a suitable sealing means 72 therein.

Figure 4:
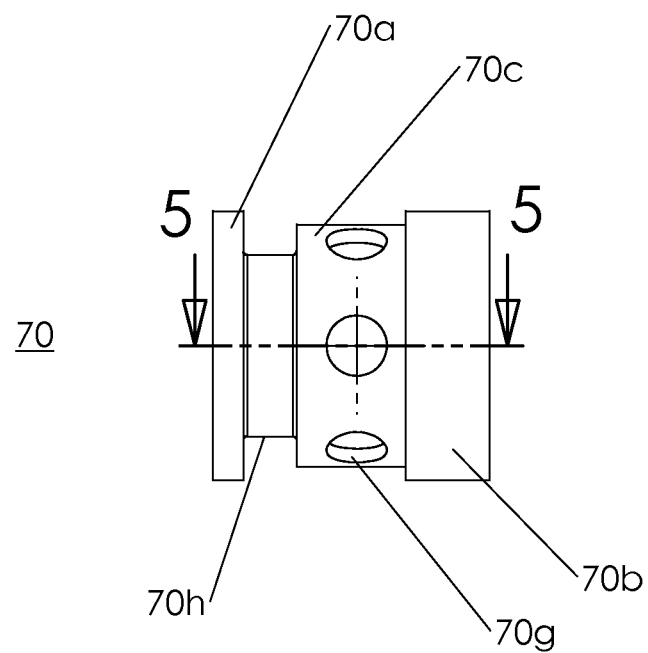
FIG. 4 is a side view of a piston in accordance with one embodiment of the present invention.
Figure 5:
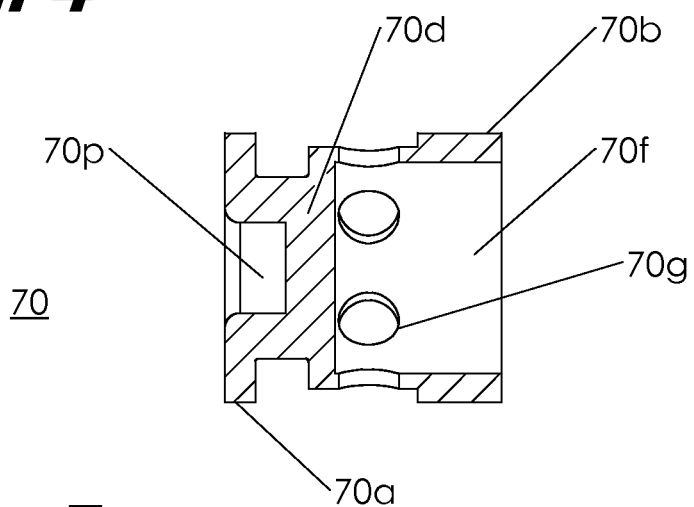
FIG. 5 is a cross-sectional side view of the piston embodiment shown in FIG. 4.
Figure 6:
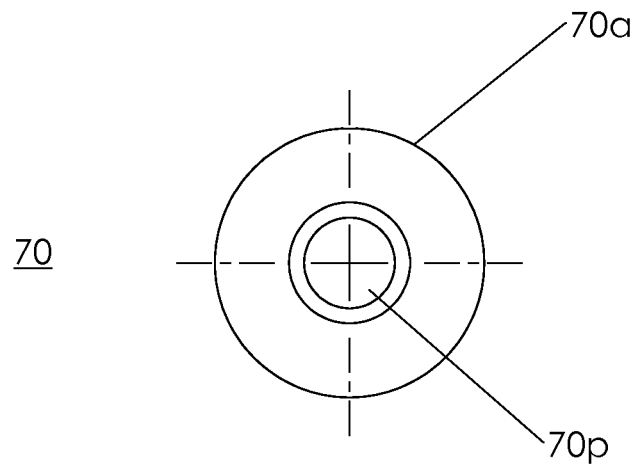
FIG. 6 is an end view of the piston embodiment shown in FIG. 4.
Figure 7:
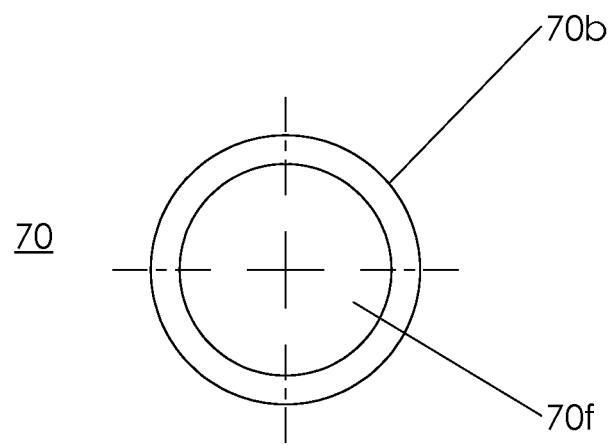
FIG. 7 is another end view of the piston embodiment shown in FIG. 4.
Figure 8:
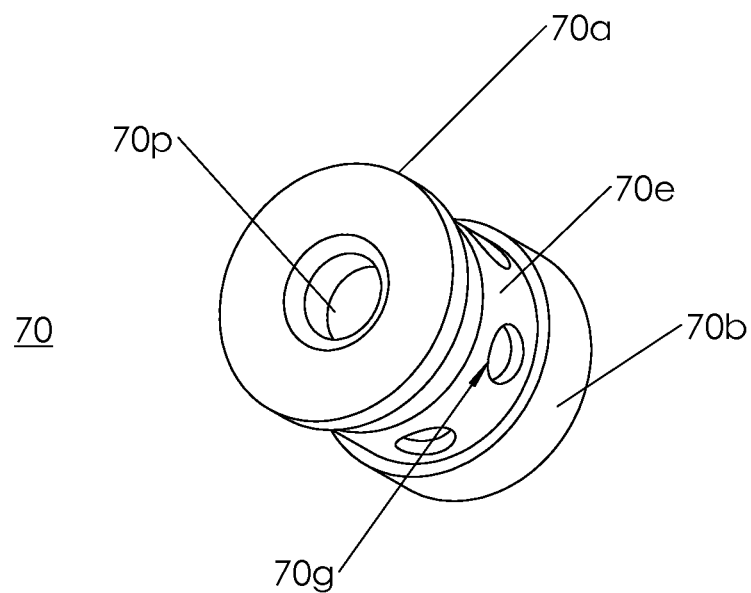
FIG. 8 is a perspective view of the piston embodiment shown in FIG. 4.
Figure 9:
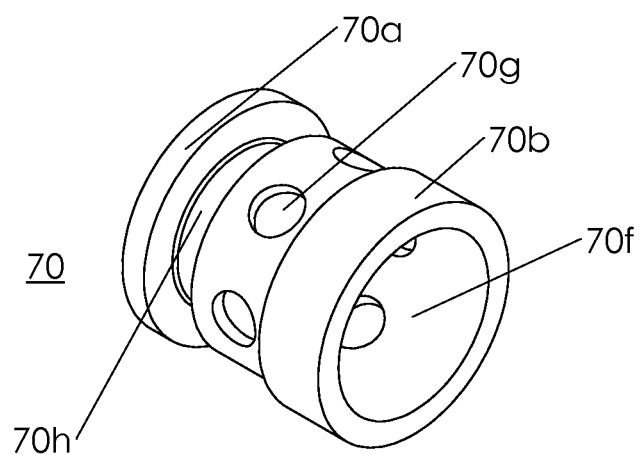
FIG. 9 is another perspective view of the piston embodiment shown in FIG. 4.

In the embodiment shown in FIGS. 4 and 5, groove 70h has a smaller diameter or outer dimension than the portion of the piston in which openings 70g are formed. In addition, the diameters or outer dimensions of flanges 70a and 70b are larger than the diameters or outer dimension of the portion of the piston wall 70e along which openings 70g are formed, and also larger than the diameter or outer dimension of groove 70h. In a particular embodiment, the first and second flanges 70a and 70b have the same diameters. However, the dimensions of the various portions of the piston may depart from these relationships as determined by the requirements of a particular application. A second cavity 70p is formed in the end of the piston at which first exterior flange 70a is located. Cavity 70p is sized to receive therein an end of an associated piston rod 80 (described below) in a slip fit.

In one embodiment, the sealing means 72 comprises a resilient o-ring/gasket having a square or rectangular cross-section conforming to the shape of the groove 70h, as shown in FIG. 2. In other embodiments, the sealing means may be formed from an O-ring or gasket having a conventional circular cross-section. However, seals having any of a variety of cross-sectional shapes may be used, depending on the needs and operating parameters of a particular application. In a manner described below, gasket aids in preventing ignition products from blowing past the first exterior flange of the piston, between the flange and the interior surfaces of the housing wall, during operation of the actuator. Suitable materials for the sealing means include EPDM rubber, silicone, Viton®, and any other material suitable for the purposes described herein.

Referring to FIGS. 2 and 5, a removable piston rod 80 has a first end 80a and a second end 80b opposite the first end. Rod 80 is structured to be insertable into housing end 12b. Rod first end 80a is structured to be insertable into piston cavity 70p in a slip fit after the remaining portions of the actuator 10 have been assembled. Rod second end 80b is threaded or otherwise structured to engage a hinge or other portion of a vehicle, for opening the vehicle hood upon the occurrence of one or more predetermined conditions. Rod 80 may be formed from a metallic material or any other suitable material.

Figure 10:
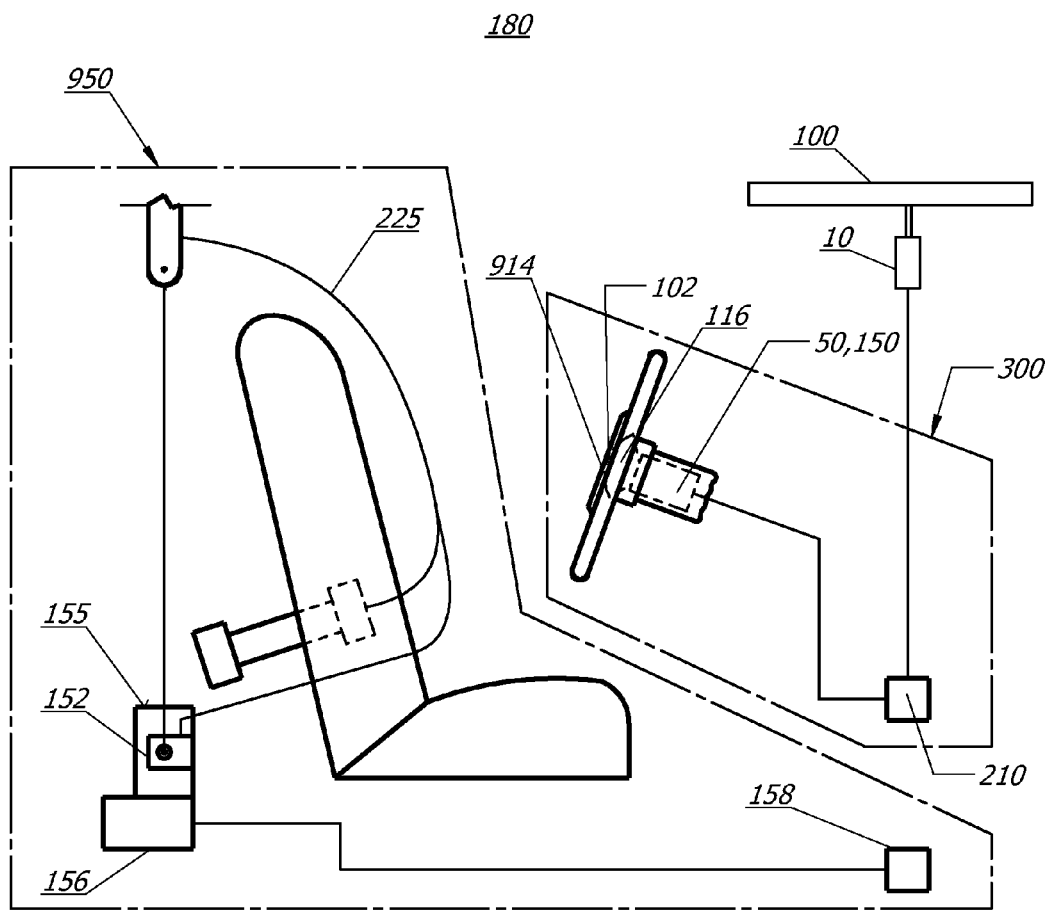
FIG. 10 is a schematic representation of an exemplary vehicle system incorporating an actuator in accordance with an embodiment of the present invention.

FIG. 10 is a schematic representation of an exemplary vehicle system incorporating an actuator in accordance with an embodiment of the present invention. Referring to FIGS. 2 and 10, in operation, the linear actuator 10 is activated when the igniter 20 receives a signal from a sensor or controller 210 operating in association with a known control algorithm. The activation signal may be responsive to an impact of a pedestrian with the vehicle hood 100 or another portion of the vehicle, or to any other selected predetermined condition. As the igniter produces pressurized ignition products after receipt of the activation signal, the ignition products are routed through piston openings 70g, into the space between flanges 70a and 70b and into contact with sealing means 72. The ignition products flow between the sealing means and the floor of groove 70h, stretching and expanding the sealing means radially outwardly and into contact with the interior surface of housing wall 12c. In this way, "blow-by" of the ignition products between first exterior flange 70a and wall 12c is prevented, thereby maximizing the pressure acting on piston 70. The lack of "blow-by" provided by the gasket 72 enhances the efficiency of operation of the initiator and actuator. Pressure from the generated ignition products forces the piston in the direction indicated by arrow A. This forces the attached piston rod 80 in the same direction, thereby lifting a vehicle hood (or a portion thereof) attached to rod second end 80b. Elevation of the hood at the appropriate time aids in mitigating harm or injury to the pedestrian in contact therewith.

The piston rod 80 is structured to be inserted into the actuator housing 12 and attached to the vehicle hood after the remainder of the actuator 10 has been assembled and installed in the vehicle. Thus, the rod 80 may be detached from the actuator and may be handled and shipped separately from the remainder of the actuator. Omission of the rod from the actuator until the actuator is installed in the vehicle prevents inadvertent expulsion of the rod from the actuator housing due to an external flame or other event causing inadvertent activation of the actuator, and also obviates any special shipping provisions needed to prevent such expulsion and guard against its effects.

Referring to FIG. 10, in a particular application, an actuator 10 incorporating the features described above is incorporated into (or operatively coupled to) an airbag system 300. Airbag system 300 comprises a housing 102 having a rupturable frontal closure 914, an airbag 116, and an actuator 10 in accordance with an embodiment of the present invention. Airbag system 300 may also include (or be in operative communication with) a crash event sensor 210 (for example, an inertia sensor or an accelerometer) including a known crash sensor algorithm that signals actuation of one or more of initiators 18 and 118 previously described.

Referring again to FIG. 10, any embodiment of an actuator 10 incorporating the features described above (or an airbag system including or in communication with such an actuator) may be incorporated into a broader, more comprehensive vehicle occupant protection system 180 including additional elements such as, for example, a safety belt assembly 950. FIG. 10 shows a schematic diagram of one exemplary embodiment of such a protection system.

Safety belt assembly 950 includes a safety belt housing 152 and a safety belt 225 in accordance with the present invention extending from housing 152. A safety belt retractor mechanism 155 (for example, a spring-loaded mechanism) may be coupled to an end portion of the belt. In addition, a safety belt pretensioner 156 may be coupled to belt refractor mechanism 155 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, each incorporated herein by reference.

Safety belt system 950 may include (or be in communication with) a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments and such term is not intended to connote that such embodiments are necessarily extraordinary or superlative examples.

The terms "coupled," "connected," and the like as used herein means the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements, for example "top," "bottom," "above," "below," etc., are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the modular knee airbag as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:

1. An actuator comprising:
   a housing having an inner wall extending between a first end portion and a second end portion of the housing, the inner wall having a constant diameter between the first and second end portions, the second end portion defining an opening, and a diameter of the opening adjacent an inner surface of the second end portion is less than the diameter of the inner wall;
   an initiator for providing pressurized gas to the housing, the initiator being secured adjacent the first end portion of the housing;
   a piston movably disposed within the housing, the piston having a first side axially opposing a second side, the second side of the piston defining a first piston cavity that extends through the second side of the piston toward the first side of the piston terminates short of the first side of the piston, and the first side of the piston defining a second piston cavity; and a piston rod having a first end and a second end, the piston rod being separately formed from the piston;

wherein the opening defined by the second end portion of the housing permits insertion of the first end of the piston rod into the opening, then into the first piston cavity, and the first end of the piston rod has a diameter approximating a diameter of the first piston cavity, and wherein a diameter of a distal of the second side of the piston is greater than the diameter of the opening defined by the second end portion of the housing, and wherein the initiator has an end disposed within the second piston cavity.

2. The actuator of claim 1 wherein the piston further comprises:

a first flange structured to provide a sliding fit between the first flange and the inner wall of the housing; and a second flange axially spaced apart from the first flange and structured to provide a sliding fit between the second flange the inner wall of the housing;

wherein the piston defines:

a groove extending circumferentially around the piston, the groove being axially between the first and second flanges; and at least one opening axially between the groove and the first flange, the at least one opening being in fluid communication between the second piston cavity and an exterior surface of the piston, and wherein the actuator further comprises a seal disposed within the groove and structured to expand in a direction toward the housing wall responsive to a flow of pressurized gas from the second piston cavity to an exterior surface of the piston.

3. The actuator of claim 1 wherein the first piston cavity is sized to form a slip fit with the piston rod when the first end of the piston rod is received in the first piston cavity.

4. The actuator of claim 1, wherein the piston comprises:

a body portion having a wall extending between the first side and second side of the piston; and a flange extending radially from the wall of the body portion adjacent the second side of the piston;

wherein:

the body portion further defines a groove extending circumferentially around the body portion, the groove for receiving a resilient seal therein, and the groove having a first diameter that is less than a diameter of the flange, and the body portion further defines at least one opening enabling fluid communication between the second piston cavity and an exterior surface of the body portion, wherein the groove is axially between the flange and the at least one opening, the body portion has a second diameter around the at least one opening that is greater than the first diameter of the groove, and the at least one opening is axially spaced apart from the groove.

5. The actuator of claim 4 wherein the flange is a first flange and the piston further comprises a second flange extending radially from the wall of the body portion adjacent the first side of the piston, wherein the first and second flanges are axially spaced apart, and the groove and the at least one opening are defined between the first flange and the second flange.

6. The actuator of claim 5 wherein a diameter of the second flange is equal to a diameter of the first flange.

7. The actuator of claim 5 wherein the second flange extends radially from an end surface of the first side of the body portion of the piston.

8. The actuator of claim 4 wherein the at least one opening comprises a plurality of openings.

9. The actuator of claim 8 wherein the flange is a first flange and the piston further comprises a second flange extending radially from the wall of the body portion adjacent the first side of the piston, wherein the first and second flanges are axially spaced apart, and the groove and the plurality of openings are defined between the first flange and the second flange.

10. The actuator of claim 4 wherein the flange extends radially from an end surface of the second side of the body portion of the piston.

11. The actuator of claim 1, wherein the initiator comprises a micro-gas generator.

12. An actuator comprising:

a housing;

an initiator for providing pressurized gas to the housing, at least a portion of the initiator being secured in the housing; and a piston movably disposed within the housing, the piston comprising:

a body portion, the body portion having a first side and a second side and a wall extending therebetween, the first and second sides being opposite and axially spaced apart from each other, the first side of the body portion defining a first interior cavity and the second side of the body portion defining a second interior cavity; and a flange extending radially from the wall of the body portion adjacent the second side;

wherein:

the body portion further defines a groove extending circumferentially around the body portion, the groove for receiving a resilient seal therein, and the groove having a first diameter that is less than a diameter of the flange;

the body portion further defines at least one opening enabling fluid communication between the first interior cavity and an exterior surface of the body portion, wherein the groove is axially between the flange and the at least one opening, the body portion has a second diameter around the at least one opening that is greater than the first diameter of the groove, and the at least one opening is axially spaced apart from the groove;

the housing defines an opening formed therein to permit insertion of a piston rod into the opening, then into the second interior cavity of the piston; and the initiator an end disposed within the first interior cavity of the body portion of the piston.

13. The actuator of claim 12, wherein the at least one opening is defined axially between the end of the initiator and the flange.

14. The actuator of claim 13 wherein the flange is a first flange, and the piston comprises a second flange, the second flange extending radially from the wall of the body portion adjacent the first side of the piston, wherein the first and second flanges are axially spaced apart, and the groove and the at least one opening are defined between the first and second flanges, and wherein the end of the initiator is axially disposed within the first interior cavity between the first flange and the second flange.

15. The actuator of claim 12, further comprising a resilient seal, wherein the resilient seal is disposed within the groove and has a rectangular or square cross-section.

16. The actuator of claim 12 wherein the initiator comprises a micro-gas generator.

\* \* \* \* \*